United States Patent
Felber et al.

(10) Patent No.: US 8,333,817 B2
(45) Date of Patent: Dec. 18, 2012

(54) FILTER ARRANGEMENT FOR AN AIR INTAKE SYSTEM

(75) Inventors: Uwe Felber, Abtsteinach (DE); Ulrich Stahl, Laudenbach (DE)

(73) Assignee: Carl Freudenberg KG, Weinheim (DE)

( * ) Notice: Subject to any disclaimer, the term of this patent is extended or adjusted under 35 U.S.C. 154(b) by 365 days.

(21) Appl. No.: 12/668,099

(22) PCT Filed: Apr. 28, 2008

(86) PCT No.: PCT/EP2008/003424
§ 371 (c)(1),
(2), (4) Date: Jan. 7, 2010

(87) PCT Pub. No.: WO2009/006957
PCT Pub. Date: Jan. 15, 2009

(65) Prior Publication Data
US 2010/0199620 A1 Aug. 12, 2010

(30) Foreign Application Priority Data
Jul. 9, 2007 (DE) .......................... 10 2007 032 006

(51) Int. Cl.
*B01D 39/00* (2006.01)
(52) U.S. Cl. ............. 55/495; 55/385.3; 55/486; 55/497; 55/503; 55/509; 96/134; 96/138
(58) Field of Classification Search .................. 55/495, 55/497, 486, 511, 499–503, 509, 521, 385.3, 55/522; 96/134, 138; 210/493.3
See application file for complete search history.

(56) References Cited

U.S. PATENT DOCUMENTS

| 5,509,950 | A | * | 4/1996 | van de Graaf et al. .......... 55/486 |
| 5,620,505 | A | * | 4/1997 | Koch et al. ....................... 96/134 |
| 5,888,442 | A | * | 3/1999 | Kometani et al. ............. 264/296 |
| 6,508,851 | B2 | * | 1/2003 | Goerg ......................... 55/385.3 |
| 2006/0090433 | A1 | | 5/2006 | Stahl et al. |

FOREIGN PATENT DOCUMENTS

| DE | 4430333 | | 3/1996 |
| DE | 4443676 | | 6/1996 |
| DE | 19856520 | | 6/2000 |
| DE | 202005019611 | | 2/2006 |
| DE | 102004037468 | | 3/2006 |
| EP | 0900585 | | 3/1999 |
| EP | 1391233 | * | 2/2004 |
| EP | 1640055 | | 3/2006 |

OTHER PUBLICATIONS

International Search Report from corresponding PCT Application No. PCT/EP2008/003424.

* cited by examiner

*Primary Examiner* — Jason M Greene
*Assistant Examiner* — Karla Hawkins
(74) *Attorney, Agent, or Firm* — Grossman, Tucker, Perreault & Pfleger, PLLC

(57) ABSTRACT

A filter arrangement for filtering a fluid or gaseous medium, in particular in a motor vehicle, comprising a housing which holds a filter element in a receiving space, wherein the filter element has an edge region which bears at least in regions against the inner wall of the housing, is characterized, with regard to the problem of creating a filter arrangement which is of structurally simple design and has a high filter efficiency, in that the housing is shaped such that the receiving space tapers at least in regions in at least one spatial direction.

11 Claims, 5 Drawing Sheets

FILTER ARRANGEMENT FOR AN AIR INTAKE SYSTEM

TECHNICAL FIELD

The invention relates to a filter arrangement for filtering a fluid or gaseous medium, in particular in a motor vehicle, comprising a housing which holds a filter element in a receiving space, wherein the filter element has an edge region which bears at least in regions against the inner wall of the housing.

PRIOR ART

Filter arrangements of the aforementioned type are used for the filtration of air. For this purpose, the air is sucked into the receiving space by means of an intake and after filtration is discharged by means of an outlet. A filter element is arranged in the receiving space for filtering the incoming air.

The filter element is provided with a sealing element. The receiving space is sealed against the environment by means of this sealing element. The sealing element is frequently developed as foam, in particular as polyurethane foam.

The receiving space is usually developed from two parts, that is from the housing and a cover which seals the housing. To seal the housing, sealing measures such as the affixing of foam on the filter element are required, which is costly and time-consuming.

DESCRIPTION OF THE INVENTION

The object of the invention therefore is to create a filter arrangement of the type mentioned at the outset which has a simple structural design and ensures a high filter efficiency.

The invention teaches that this embodiment makes it possible to clamp the filter element and therefore fix it airtight. Furthermore it was also found that the taper enables critical regions within the receiving space to be developed geometrically such that the formation of interstices or gaps between the edge regions of the filter element and the inner wall of the housing is prevented. For this purpose, the filter element with its edge regions at least bears against the inner wall of a housing which preferably has a rectangular and/or cuboid design. Hence a filter arrangement is indicated that has a simple structural design with a high filter efficiency. Consequently, the aforementioned object is solved.

The housing and the filter element can have different geometric shapes, as long as the housing tapers more than the filter element.

The receiving space could have corner regions which taper in the direction of the corner regions such that the distance between two opposite surfaces of the inner wall decreases. By means of this specific embodiment, a rectangular filter element is clamped in the critical corner regions such that no interstices or gaps can develop in the corner regions. In view of this background, the cross section of the receiving space could essentially have a rectangular shape and taper in the direction of its corner regions.

The housing could have at least one groove for holding one part of the filter element. In view of this background, it is actually conceivable, that one pleat of the filter element is inserted into the groove. In this manner, it becomes possible to fix the filter element in the housing on the one hand, and on the other hand achieve a sealing effect between the housing and a cover.

The housing could have an inlet or discharge flow connection for connecting the flow of the receiving space. Unfiltered or filtered air can be directed through an inlet or discharge connection. Ducts could be attached on said connection by means of hose clamps.

The housing could be lockable by means of a cover. By providing a cover, the receiving space can be opened for exchanging a spent filter element.

The cover could have at least one groove for holding a projection of the edge region of the filter element. By means of this specific embodiment, the filter element is fixed on the one hand, and on the other hand a sealing effect between the cover and the housing is accomplished. Any further sealing measures, such as O-rings or other separate components, can be dispensed with.

The groove could taper such that the projection is compressed when the housing and the cover are assembled. By means of this specific embodiment, the receiving space is particularly sealed reliably against the atmosphere.

The cover could have an inlet or discharge flow connection for connecting the flow of the receiving space. Unfiltered or filtered air could be directed through the inlet or discharge connection. Ducts could be attached on said connection by means of hose clamps.

The filter element could comprise a rectangular, pleated layer. In view of this background, it is actually conceivable that the filter element is designed as a flat filter and has rectangular bellows. The pleated design increases the effective filter surface. It is also conceivable that at least the bellows of the filter element has activated carbon particles. By means of this specific embodiment, unpleasant odors can be absorbed.

The edge regions could be developed strip-shaped and be arranged on the side walls of the layer. By means of this specific embodiment, the development of interstices or gaps between the bellows of the filter element and the inner wall of the housing will be prevented.

In view of this background, it is conceivable that the layer and/or the edge regions are manufactured from non-woven fabric. Non-woven fabric is particularly suitable for manufacturing filter elements, since its porosity can be adjusted easily. Furthermore, non-woven fabrics can be thermally joined by simple fabrication, without problems.

The non-woven fabric could be compressed to at least 20% of its thickness in the no-load condition. By means of this specific embodiment, the edge regions could develop an extremely elastic contact element between the inner wall of the housing and the pleated layer. The compressibility to at least 20% of its thickness in the no-load condition permits a particularly tight contact of the filter element in the tapering regions of the housing.

The edge regions could have a height of 5 to 70 mm and a width of 2 to 4 mm. This specific embodiment permits reliable and leak proof mounting of the edge regions in the groove of the cover. The edge regions project into the groove of the cover such that the edge regions can be compressed from the tapering groove at least at their end. In this manner, a special sealing effect is achieved.

The folded layer could comprise at least one end pleat that engages with a groove of the housing. By means of this specific embodiment, a sealing effect is achieved on the one hand, and a secure positioning of the filter element in the housing, on the other.

A filter element could include a flat layer with end pleats and edge regions, wherein the edge regions have projections which protrude beyond the pleat tips of the flat layer. Such filter element is particularly suited for positioning in a filter arrangement described here. The projections of the edge regions, which protrude beyond the pleat tips of the flat layer can on the one hand be advantageously mounted in grooves of a cover of the housing and fix the filter element, and on the other hand accomplish a high seal effect.

The filter arrangement described here is suited particularly for use in the air intake system of motor vehicles, because it filters the engine intake air especially reliable. The filter arrangement described here is also suitable for the reliable filtration of air in a motor vehicle air conditioning system.

Thus, there are now different possibilities to design and further develop the teaching of the present invention advantageously. For that purpose, on the one hand, refer to the subordinate claims, and on the other hand, to the subsequent illustration of a preferred embodiment of the invention, by means of the drawing.

In conjunction with the illustration of the preferred embodiment of the invention, also generally preferred embodiments and developments of the teaching are explained, using the drawing.

BRIEF DESCRIPTION OF THE DRAWINGS

In the drawings,
FIG. 1a is a section of a corner region of the housing.

EMBODIMENT OF THE INVENTION

Figure 1:
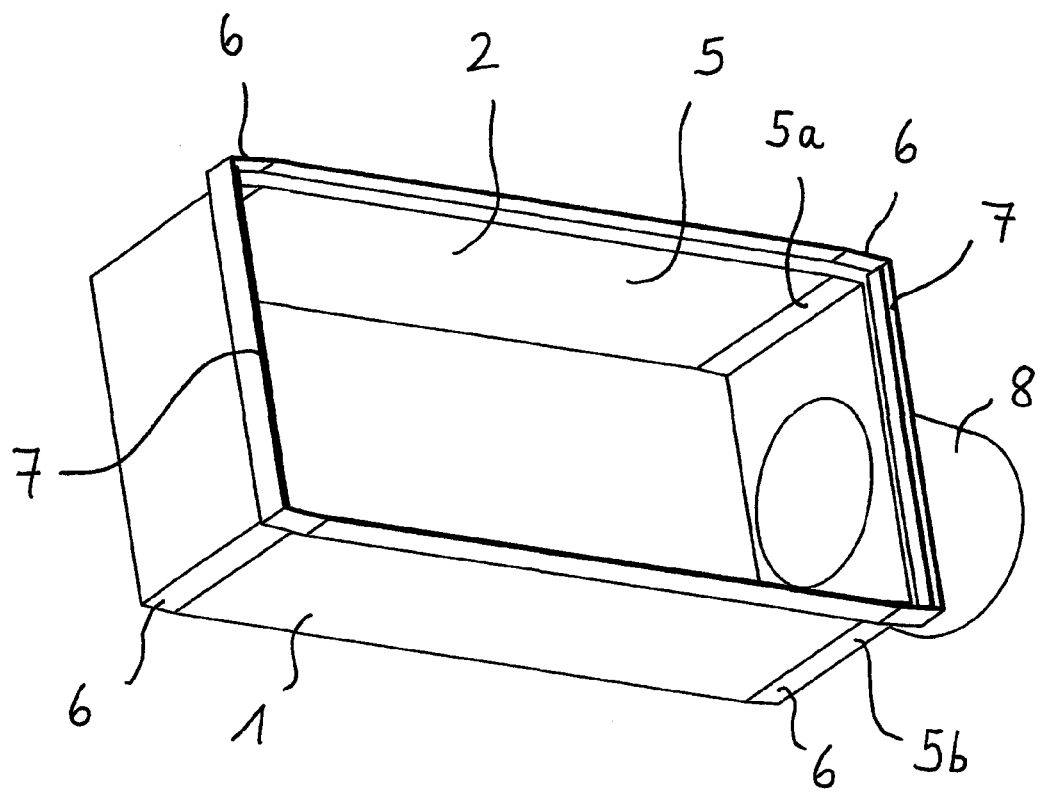
FIG. 1 is an isometric view of the housing.
Figure 1:
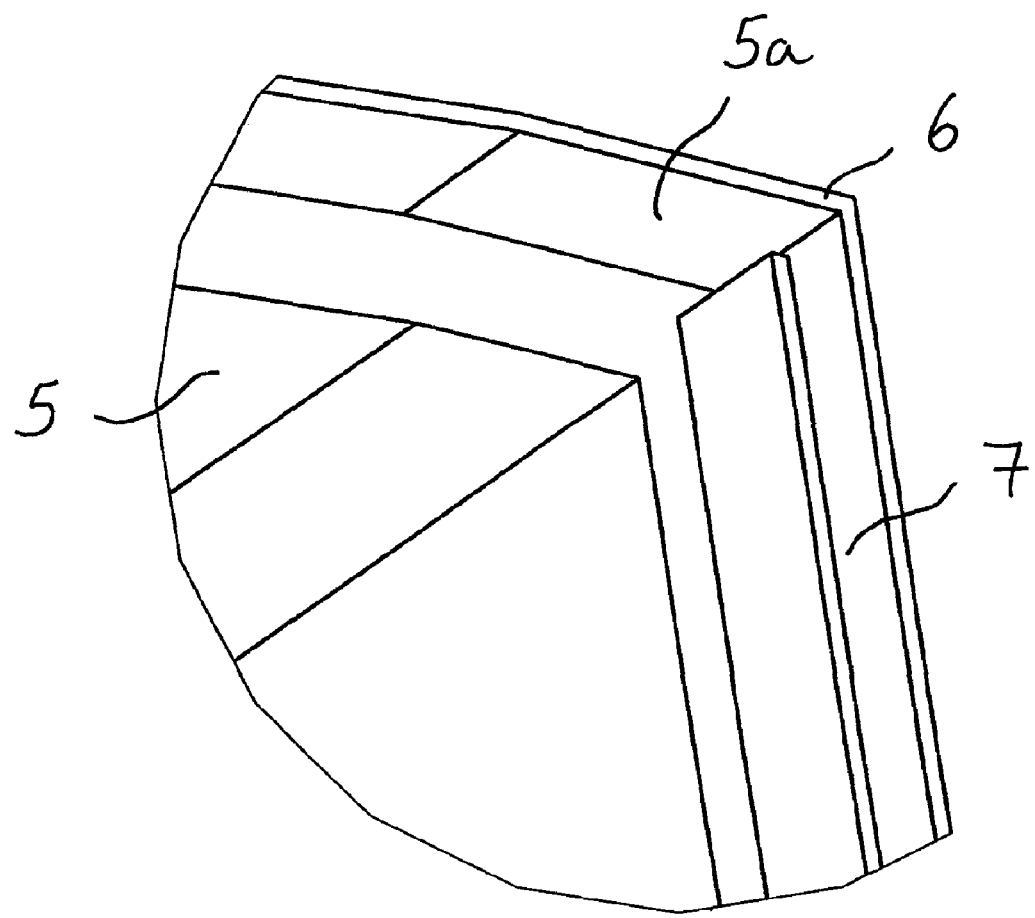
Figure 2:
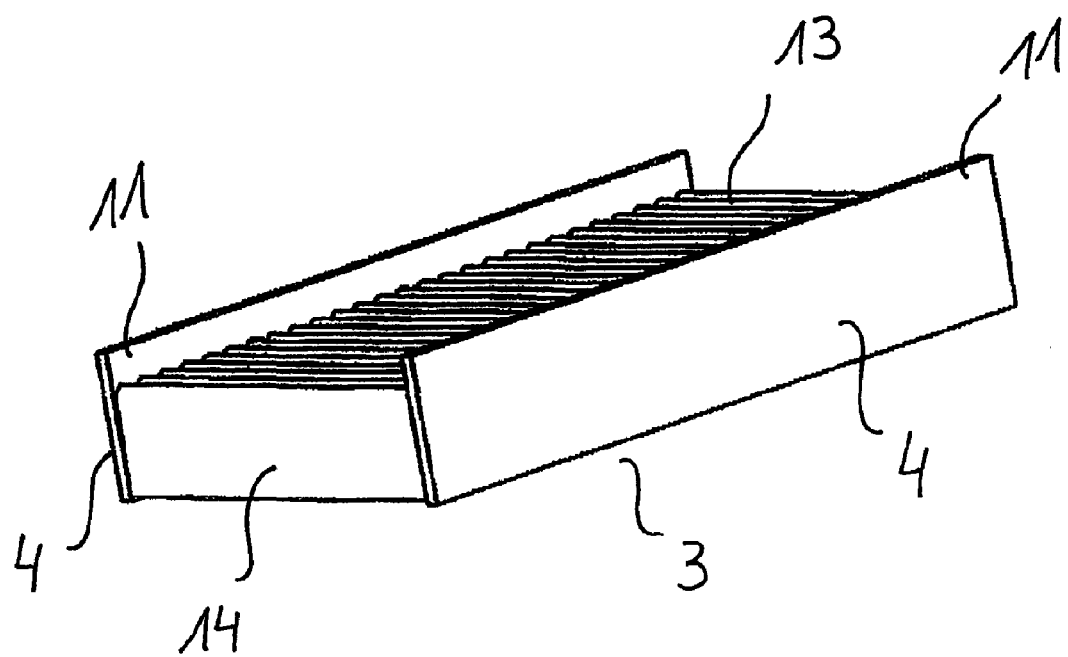
FIG. 2 is a view of the filter element.

FIG. 1 shows a housing 1, which can hold a filter element 3 illustrated in FIG. 2 in a receiving space 2. The housing 1 has an inner wall 5, which the edge regions 4 of the filter element 3 shown in FIG. 2 bear against. The housing 1 is shaped such, that the receiving space 2 tapers at least in regions in at least one spatial direction, namely in the direction of its corner regions 6. For this purpose, the receiving space 2 is developed as a rectangular cross section. The receiving space 2 tapers in the direction of the corner regions 6 such that the distance between two opposite surfaces 5a, 5b of the inner wall 5 decreases. For this purpose, the distance between the opposite surfaces 5a, 5b can decrease continuously or discontinuously. FIG. 1a shows a corner region 6 of the housing 1.

The housing 1 has at least one groove 7 for holding a part 14, namely the final pleat of a pleated layer 13 of the filter element 3 according to FIG. 2. The housing 1 has an inlet or discharge flow connection 8 for connecting the flow of the receiving space 2.

Figure 3:
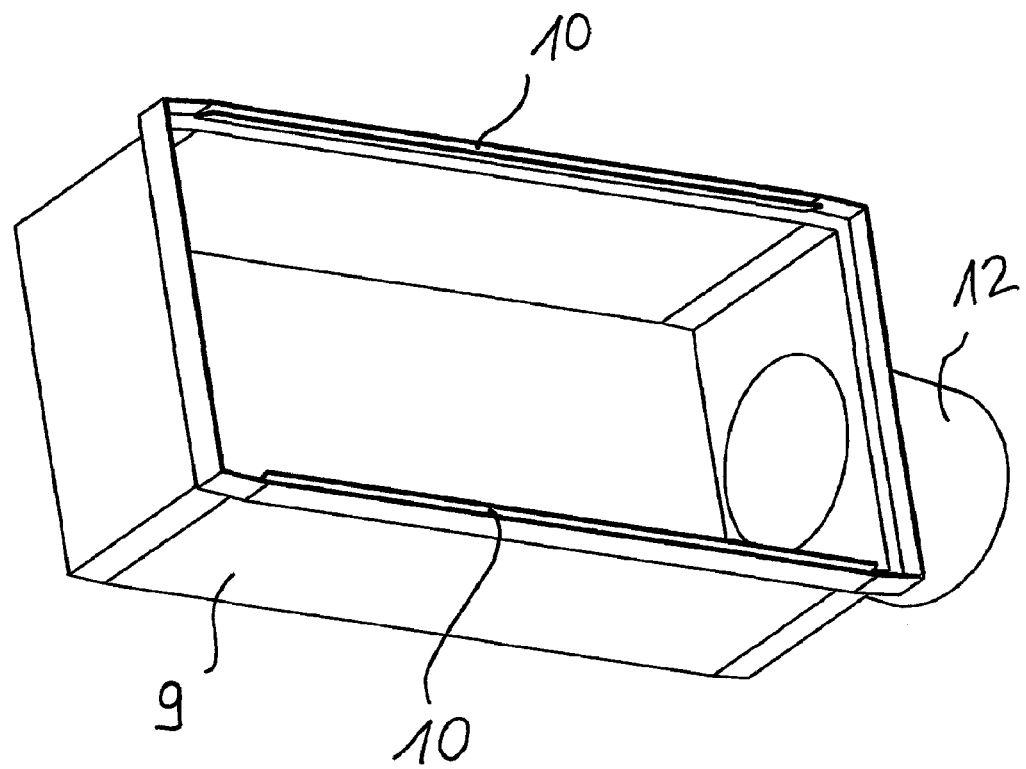
FIG. 3 is an isometric view of the cover.
Figure 4:
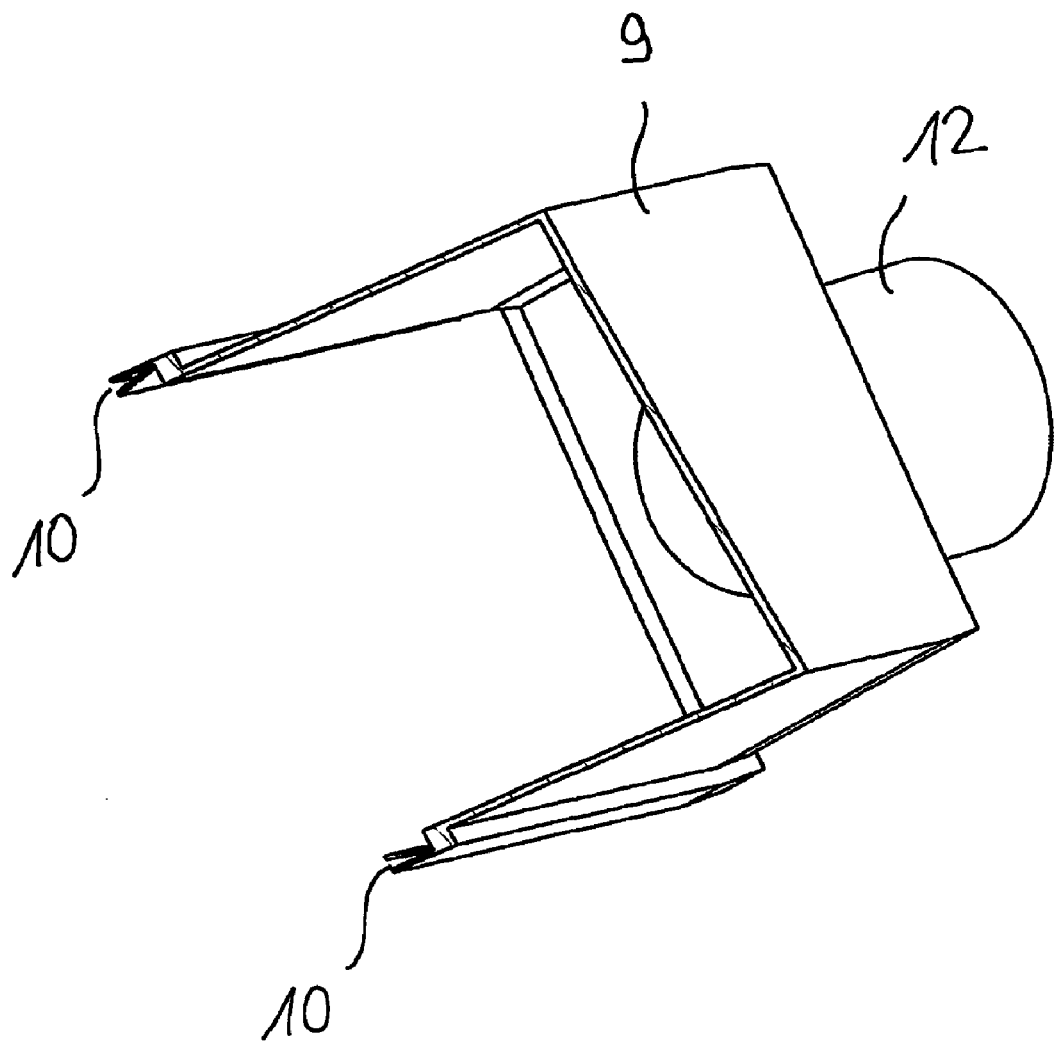
FIG. 4 is a partial sectional view of the cover.

The housing 1 is lockable by means of a cover 9 according to FIG. 3. The cover 9 has at least one groove 10 for holding a projection 11 of the edge region 4 of the filter element 3 according to FIG. 2. The groove 10 tapers such that the projection 11 is compressed when assembling the housing 1 and the cover 9. FIG. 4 shows the taper of the groove 10 as a partial cross section of the cover 9. The cover 9 has an inlet or discharge flow connection 12 for connecting the flow of the receiving space 2.

FIG. 2 shows a rectangular filter element 3, which is held in receiving space 2. The filter element 3 has a rectangular pleated layer 13 in the form of bellows. On the side walls of the pleated layer 13, strip-shaped edge regions 4 of non-woven fabric are arranged. These can either be bonded or welded to the pleated layer 3 [sic]. The layer 13 is also manufactured from non-woven fabric.

At least the non-woven fabric from which the strip-shaped edge regions 4 are manufactured can be compressed to at least 20% of its thickness in the no-load condition.

The edge regions 4 are 10 mm high and 3 mm wide. The edge regions 4 have projections 11 which protrude beyond the pleat tips of the flat layer 13. These projections 11 can be held in the groove 10 of the cover 9.

The pleated layer 13 has at least one end pleat 14 which can engage with the groove 7 of the housing 1.

As regards further advantageous embodiments and developments of the teaching according to the invention, please refer to the general section of the specification, on the one hand, and on the other to the enclosed patent claims.

In conclusion, it should be emphasized explicitly that the above embodiment was purely selected at random, merely for discussing the teaching of the invention, and is not limited to this embodiment, however.

What is claimed is:

1. A filter arrangement for filtering a fluid or gaseous medium, comprising a housing including inner side walls and a bottom wall which holds a filter element in a receiving space, wherein the filter element has an edge region which bears at least in regions against the inner side walls of the housing, wherein the housing is shaped such that the receiving space has corner regions, which are perpendicular to the bottom wall, and said receiving space tapers in the direction of the corner regions, such that the distance between two opposite faces of the inner side walls decreases at the corner regions such that the filter element is clamped in the corner regions, the housing being closed by means of a cover, and the cover has at least one groove for holding a projection of the edge region of the filter element, wherein the groove tapers such that the projection is compressed at the end of the edge region when the housing and the cover are joined together.

2. The filter arrangement according to claim 1, wherein the housing has at least one groove for holding a part of the filter element.

3. The filter arrangement according to claim 1, wherein the housing has an inlet or outlet connection for connecting the flow of the receiving space.

4. The filter arrangement according to claim 1, wherein the cover has an inlet or discharge flow connection for connecting the flow of the receiving space.

5. The filter arrangement according to claim 1, wherein the filter element comprises a rectangular, pleated layer.

6. The filter arrangement according to claim 5, wherein the edge regions are developed strip-shaped and are arranged on the side walls of the layer.

7. The filter arrangement according to claim 5 or 6, wherein the layer and/or the edge regions are manufactured from non-woven fabric.

8. The filter arrangement according to claim 7, wherein the non-woven fabric can be compressed to at least 20% of its thickness in the no-load condition.

9. The filter arrangement according to claim 7, wherein the edge regions have a height of 5 to 70 mm and a width of 2 to 4 mm.

10. The filter arrangement according to claim 5, wherein the pleated layer has at least one end pleat that is engaged in a groove of the housing.

11. The filter element for positioning in a filter arrangement according to claim 1, comprising a flat layer with the end pleats and edge regions, wherein the edge regions have projections, which protrude beyond the pleat tips of the flat layer.

* * * * *